United States Patent Office 2,813,205
Patented Nov. 12, 1957

2,813,205

REGULATING MEANS FOR DYNAMO-ELECTRIC MACHINES

Sydney Lucas, Harrow, England, assignor to Rotax Limited, London, England

Application September 8, 1955, Serial No. 533,184

1 Claim. (Cl. 290—31)

When a dynamo-electric machine is of the kind adapted to serve both for starting an engine, and for generating current by power derived from the engine, the machine being also such that its field current can be controlled by a regulator responsive to either the voltage of, or the current supplied by, the generator, it is sometimes required to be able to establish a field of extra strength when the machine is acting as a motor, the field being variable under the control of the regulator when the machine is acting as a generator.

The object of the present invention is to provide a regulator which will enable the above mentioned requirement to be met in a simple manner.

A regulator in accordance with the invention comprises the combination of a spring-loaded carbon pile resistance, an electromagnet having a pair of oppositely-acting windings and a rectifier in series with one of the windings, the regulator being adapted to operate as hereinafter described.

Figure 1:
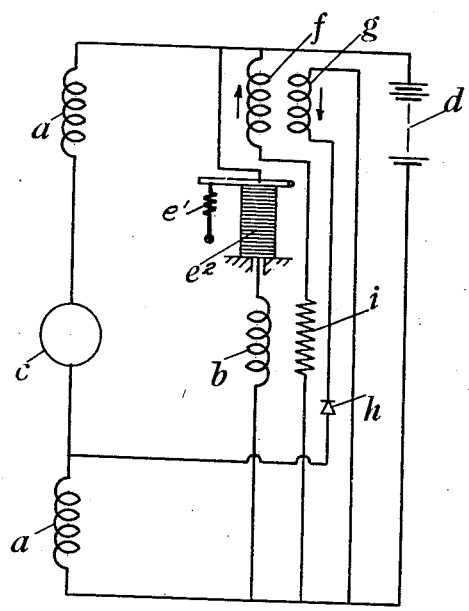
Figure 2:
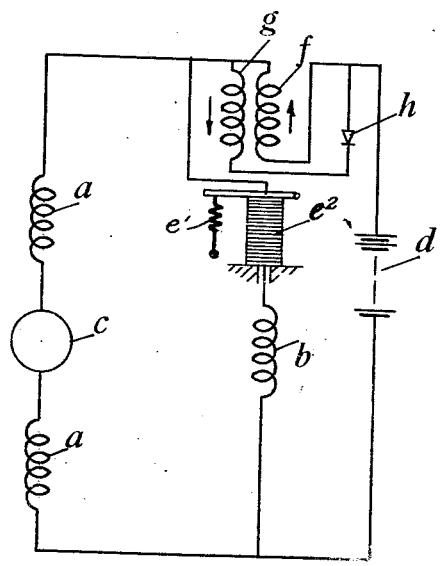

In the accompanying drawings Figure 1 illustrates diagrammatically an application of the invention to a voltage regulator, and Figure 2 illustrates an application to a current regulator.

Referring to Figure 1, the dynamo-electric machine there shown includes series field windings $a$, a shunt field winding $b$, and a rotary armature $c$, the machine being connected to a storage battery $d$.

The regulator comprises a carbon-pile resistance $e$ connected in series with the shunt winding $b$, the pile being loaded by a spring $e^1$ which is adapted to act on the pile through the medium of an armature $e^2$ for compressing the pile and so minimising its resistance. The action of the spring is opposed by an electromagnet for increasing the pile resistance.

According to the invention the electromagnet of the regulator includes two oppositely-acting windings $f$, $g$. The winding $f$ is connected in parallel with both of the series windings $a$ and the battery $d$, and may have connected in series with it a resistance $i$. In the example illustrated the winding $g$ is connected to the ends of one of the series windings $a$. Also a rectifier $h$ is arranged in series with the winding $g$.

The arrangement is such that when the machine is acting as a motor, current then being supplied by the battery $d$, current flows through both of the regulator windings $f$, $g$, and as the effect of the current in one of them is neutralised by the effect of the current in the other, the spring acting on the pile exerts its full effect and so reduces the resistance of the pile to its minimum. Maximum current then flows through the field winding $b$.

After the engine has been started, the machine acts as a generator for supplying current to the battery. In this condition the rectifier $h$ prevents passage of current to the winding $g$, and the regulator then depends only on the action of the current in the winding $f$, causing the current in the field winding $b$ to vary with the generator voltage in the normal manner.

When it is required that the regulator shall be responsive to the current output of the generator, an arrangement as illustrated by Figure 2 may be employed. This differs from that shown in Figure 1, in that the two electromagnet windings $f$, $g$ are arranged in series with the generator and battery.

Having thus described my invention what I claim as new and desire to secure by Letters Patent is:

In an engine-starting and electric current generating system having a storage battery, and a dynamo electric machine connected to the battery and adapted to serve both as a motor energisable by current from the battery for starting an engine, and as a generator for supplying current in response to power derived from the engine, a regulator for current in the field system of the machine, comprising in combination a spring-loaded carbon pile resistance connected to the field system of the machine, and an electromagnet arranged in association with the carbon pile resistance to serve, by opposing the action of the pile-loading spring, to increase the resistance of the pile, the electromagnet having in electrical connection with the battery and machine a pair of oppositely-acting windings which are both energisable by current from the battery, but only one of which is energisable by current from the machine, the other winding having arranged in series with it a rectifier which prevents flow of current from the machine to the last mentioned winding.

References Cited in the file of this patent

UNITED STATES PATENTS 2,716,213   Neild ---------------- Aug. 23, 1955